June 14, 1927.
R. E. WILSON ET AL
1,632,259
TESTING DEVICE
Filed Jan. 5, 1925
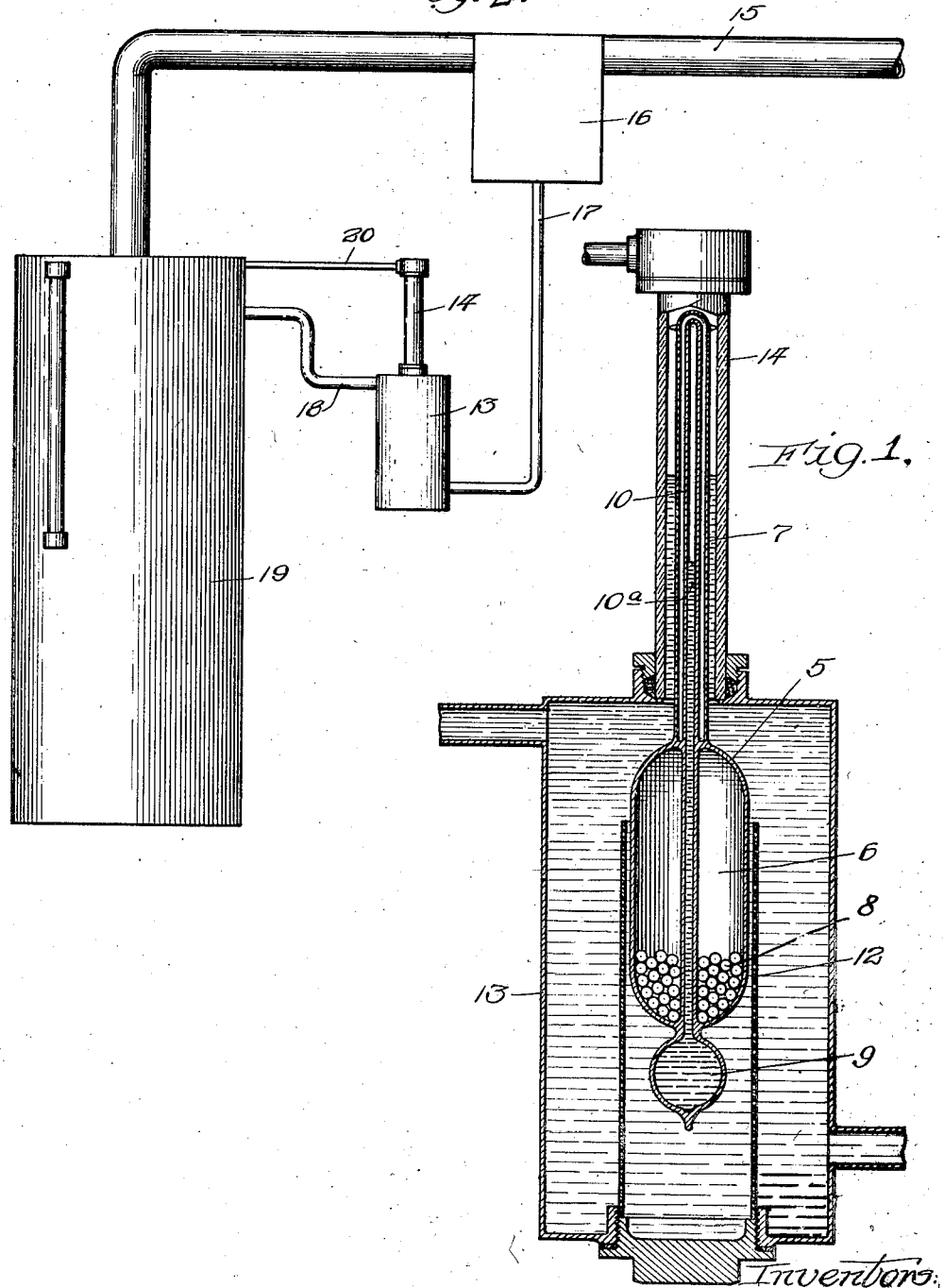
Inventors:
Robert E. Wilson,
William H. Bahlke, Patented June 14, 1927.

1,632,259

UNITED STATES PATENT OFFICE.

ROBERT E. WILSON, OF CHICAGO, ILLINOIS, AND WILLIAM H. BAHLKE, OF WHITING, INDIANA, ASSIGNORS TO STANDARD OIL COMPANY, OF WHITING, INDIANA, A CORPORATION OF INDIANA.

TESTING DEVICE.

Application filed January 5, 1925. Serial No. 722.

This invention relates to improvements in testing devices and will be fully understood from the following description, illustrated by the accompanying drawings, in which:

Figure 1 is a sectional view of the testing device in a suitable container, and

Figure 2 is a diagrammatic view illustrating a method in which the device is employed.

In accordance with the present invention, we provide a hydrometer for testing gasoline or other petroleum oils and distillates, said hydrometer being provided with a thermometric column so proportioned that the rate of fall of the hydrometer with changes in temperature of the oil is substantially the same as the rate of rise of the thermometric column. Such a hydrometer may be so calibrated in connection with an oil having a certain Baumé or American Petroleum Institute gravity at a predetermined temperature as to sink in such oil until the level of liquid is opposite the top of the thermometric column, regardless of the temperature of the oil.

Referring to the drawing, the numeral 5 indicates a hydrometer having an enlarged bulb 6 provided with a stem 7, the bulb containing the necessary weights 8. Sealed to the bulb 6 is a thermometric bulb 9 having a stem 10 which rises within the hydrometer stem 7, the bulb 9 and stem 10 containing a liquid $10^a$ having a substantially uniform rate of expansion with rise in temperature, such as toluol, cresol, or the like. The volume of the thermometric liquid and the diameter of the thermometric stem are so proportioned with respect to the weight, column and stem size of the hydrometer that the rate of sinking of the hydrometer with change of temperature in a liquid of a certain A. P. I. gravity at, say, 60° F. is substantially the same as the rate of rise of the thermometric column.

Thus, a hydrometer constructed in accordance with the present invention, and which comes to equilibrium with the thermometric column at the level to which the hydrometer sinks in a liquid of 56° A. P. I. gravity at 60° F. has the following specifications:

Volume of hydrometer to highest scale mark, 100 cc.; volume of hydrometer to lowest mark, 93.87 cc.; outside diameter of stem, 0.7214 cc.; mass of hydrometer, 72.19 gm.; bore of thermometer tube, 0.07508 cm.; volume of toluene in thermometer, 1.0 cm. at 32° F.; volume of thermometric bulb, 0.9034 cc.

These specifications are not to be regarded as limiting the structural details of the hydrometer, but merely as exemplary; the precise proportions in each case being best determined as is usual in the construction of hydrometers, i. e., by trial and error.

In such a hydrometer the bore of the thermometer is so proportioned with respect to the volume of the thermometric liquid that the expansion of the liquid for a predetermined rise in temperature is indicated by a linear rise of its level equal to the change in level of the hydrometer caused by the change in density of the liquid with the same temperature change. Thus, with the above hydrometer a change in temperature of 9° F. causes a change of 1° A. P. I. in the density of the liquid, indicated by a space of 1.25 cm. on the hydrometer stem. With the same temperature change, the level of the thermometric column rises 1.25 cm.

In Fig. 1, a hydrometer 5, as described, is suitably confined with a well or cylinder 12 having perforated walls, the cylinder being located within a chamber 13 provided with a vertically projecting portion 14 of glass or other suitable transparent material, into which the stem of the hydrometer projects. As shown in Fig. 2, the chamber 13 may suitably be in a by pass in a condenser or run-down line 15 from a still such as a Burton type pressure still. A trap 16 is placed in the line 15, and liquid flows from the trap 16 through line 17 to chamber 13; thence through line 18 to the receiver 19, to which the line 15 leads. A line 20 connects the upper portion of the projecting member 14 of the chamber 13 with the vapor space of receiver 19.

Although the invention is described herein more particularly as applied to oils, which are in general lighter than water, it will, of course, be understood that the invention may be embodied in a device suitable for use in other liquids, lighter or heavier than water, having a substantially constant rate of expansion.

Claims:

1. A hydrometer for oils comprising a thermometer the liquid of which extends up the stem of the hydrometer, the level of the thermometric liquid coinciding with the oil level when the hydrometer is immersed in an oil of a predetermined specific gravity at a predetermined temperature, the hydrometer and thermometer being proportioned relatively one to the other so that a change of temperature effects an equal and opposite movement of the hydrometer and the thermometric liquid level.

2. In an oil condensing system, a run-down line for condensed products, a receiver connected thereto, a trap in said run-down line, a chamber, a hydrometer in said chamber comprising a thermometer so proportioned that the rate of descent of the hydrometer in condensate of predetermined specific gravity with rise of temperature is substantially equal to the rate of rise of the thermometric column, the condensate and thermometric liquid levels being the same for an oil of said predetermined specific gravity, whereby the relationship of the specific gravity of the liquid in the chamber to that of the liquid of predetermined specific gravity is indicated, a liquid line connecting the trap to said chamber, a liquid line connecting the chamber to the receiver, and a line connecting the top of the chamber to the upper portion of the receiver.

ROBERT E. WILSON.
WILLIAM H. BAHLKE.